United States Patent
Kim et al.

(10) Patent No.: US 10,634,240 B2
(45) Date of Patent: Apr. 28, 2020

(54) SHIFT LOCK STRUCTURE OF SHIFT LEVER

(71) Applicants: Hyundai Motor Company, Seoul (KR); Kia Motors Corporation, Seoul (KR)

(72) Inventors: Yong Ik Kim, Hanam-si (KR); Chang Hyun Lee, Seoul (KR); Bum Jun Kim, Bucheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 165 days.

(21) Appl. No.: 15/979,115

(22) Filed: May 14, 2018

(65) Prior Publication Data

US 2019/0195340 A1 Jun. 27, 2019

(30) Foreign Application Priority Data

Dec. 26, 2017 (KR) .................. 10-2017-0179395

(51) Int. Cl.
    *F16H 59/02* (2006.01)
(52) U.S. Cl.
    CPC . *F16H 59/0278* (2013.01); *F16H 2059/0282* (2013.01)
(58) Field of Classification Search
    CPC ......... F16H 59/0278; F16H 2059/0282; F16H 61/22; F16H 2061/223; F16H 2061/226
    See application file for complete search history.

(56) References Cited

U.S. PATENT DOCUMENTS

| 4,909,096 | A | * | 3/1990 | Kobayashi | F16H 59/10 192/220.3 |
|---|---|---|---|---|---|
| 4,947,967 | A | * | 8/1990 | Kito | B60R 25/02144 192/220.7 |
| 5,016,738 | A | * | 5/1991 | Shirahama | F16H 59/10 180/271 |
| 6,575,049 | B1 | | 6/2003 | Hasegawa | |
| 9,556,951 | B2 | | 1/2017 | Jeong et al. | |

FOREIGN PATENT DOCUMENTS

| JP | H 0840099 A | 2/1996 |
|---|---|---|
| JP | 2000-127793 A | 5/2000 |
| JP | 2000-272369 A | 10/2000 |
| JP | 2000-318478 A | 11/2000 |
| JP | 2003-335145 A | 11/2003 |
| KR | 10-2017-0081879 A | 7/2017 |

* cited by examiner

*Primary Examiner* — Thomas C Diaz
(74) *Attorney, Agent, or Firm* — Morgan, Lewis & Bockius LLP

(57) ABSTRACT

A shift lock structure of a shift lever, includes: an engaging lever provided at a lower end portion of the shift lever and rotated when the shift lever is rotated; a solenoid valve having a plunger extending in a direction intersecting a direction in which the engaging lever is rotated and configured to allow the plunger to be retracted or extracted depending on a shift stage; and a lock lever located in a rotation direction in which the engaging lever is rotated from a P-stage to another stage, and coupled with the plunger such that, when the shift stage is the P-stage, when the plunger is extracted and moved in an axial direction thereof, the lock lever blocks rotation of the engaging lever, implementing the shift lock.

11 Claims, 6 Drawing Sheets

SHIFT LOCK STRUCTURE OF SHIFT LEVER

CROSS-REFERENCE TO RELATED APPLICATION

The present application claims priority to Korean Patent Application No. 10-2017-0179395, filed on Dec. 26, 2017 in the Korean Intellectual Property Office, the entire contents of which is incorporated herein for all purposes by this reference.

BACKGROUND OF THE INVENTION

Field of the Invention

The present invention relates to a shift lock structure of a shift lever provided in a shift lever assembly in a vehicle provided with an automatic transmission, and to a shift lock structure which is simple in structure and makes it easy to release a shift lock while ensuring that a shift lock, which is automatically implemented in a P-stage, is more securely implemented.

Description of Related Art

A shift lock structure is a safety device which is provided in a shift lever assembly in a vehicle provided with an automatic transmission to prevent the shift lever from being moved to another stage when the shift lever is operated in the state in which the brake pedal is not pressed when the shift lever is positioned at the P-stage, for example, during parking.

However, in recent years, double parking is frequently performed due to a shortage of parking spaces. In double parking, when the shift lever is positioned at the P-stage and thus a shift lock is implemented, it is impossible to move the vehicle. Therefore, vehicle manufacturers provide a release button for temporarily releasing shift lock so that the shift lever may be moved to the N-stage after the shift lever is positioned at the P-stage after parking.

A structure in which the shift lock is released by the release button is implemented by a lock lever, a linkage, etc. In the instant case, there is a problem in that, since a large number of linkages is used, the number of parts is large and noise is generated during return of the parts. Furthermore, in the case in which a solenoid valve is used, when the shift lever is forcibly released due to erroneous operation, theft or the like in the P-stage shift lock state, the shift lever assembly may be damaged even with a relatively small force.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a shift lock structure of a shift lever which is configured to be resistant to erroneous operation while being simple in configuration.

To achieve the aspects described above, a shift lock structure of a shift lever according to an exemplary embodiment of the present invention may include: an engaging lever provided at a lower end portion of the shift lever and rotated when the shift lever is rotated; a solenoid valve having a plunger extending in a direction intersecting a direction in which the engaging lever is rotated and configured to allow the plunger to be retracted or extracted depending on a shift stage; and a lock lever located in a rotation direction in which the engaging lever is rotated from a P-stage to another stage, and coupled with the plunger such that, in the case in which the shift stage is the P-stage, when the plunger is extracted and moved in the axial direction thereof, the lock lever blocks the rotation of the engaging lever, implementing shift lock.

The lock lever may a plate shape having a predetermined thickness and area, and the engaging lever and the lock lever may be in plane contact with each other.

The lock lever may have a coupling portion, which is coupled with the plunger, and the coupling portion may be a through hole formed in the lock lever.

The lock lever may have a coupling portion, which is coupled with the plunger, and the coupling portion may be formed in a cylindrical shape and have a through hole formed in the center thereof, the coupling portion protruding from the surface of the lock lever which is opposite to the plunger.

The coupling portion may have a truncated cone shape, the diameter of which decreases from one end side toward a remaining end side of a surface of the lock lever.

The lock lever may have a coupling portion, which is coupled with the plunger, and the coupling portion may have a through hole formed in the center thereof. The coupling portion may protrude from the surface of the lock lever which is opposite to the plunger, and a radially protruding rib may be formed on the external circumferential surface of the coupling portion.

The lock lever may have an interference prevention groove recessed inwardly from the surface thereof, so that the shift lever and the lock lever may be prevented from interfering with each other when the shift lever is rotated.

The engaging lever may be rotatably disposed to the main bracket, and the solenoid valve disposed to the main bracket and the lock lever coupled to the plunger of the solenoid valve may be located between the main bracket and the rotation direction of the engaging lever.

The front side of the lock lever may be disposed to be in plane contact with the engaging lever, and the rear side of the lock lever may be in contact with the rear surface of the main bracket to be supported, so that, at the time of a shift lock, the lock lever may be inserted and supported between the engaging lever and the main bracket, preventing the engaging lever from being rotated.

An elastic member may be disposed inside the solenoid valve to press the plunger in the direction in which the plunger is extracted, so that when shifting to the P-stage is performed again after the shift lock is released, the lock lever is moved by the elastic force of the elastic member in the direction in which the lock lever blocks the engaging lever, implementing the shift lock.

According to the shift lock structure of the shift lever of the present invention as described above, the release structure for releasing the shift lock may be implemented with a simple configuration. Furthermore, when the shift lever is forcibly operated at the time of erroneous operation or theft, the specification for forced release of the P-stage by the lock lever may be enhanced, improving quality. Furthermore, by disposing the solenoid valve at the rear side, it is possible to implement a compact shift lever assembly, so that layout may be enhanced, and flexibility in designing a console portion and the productivity of an assembly line may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
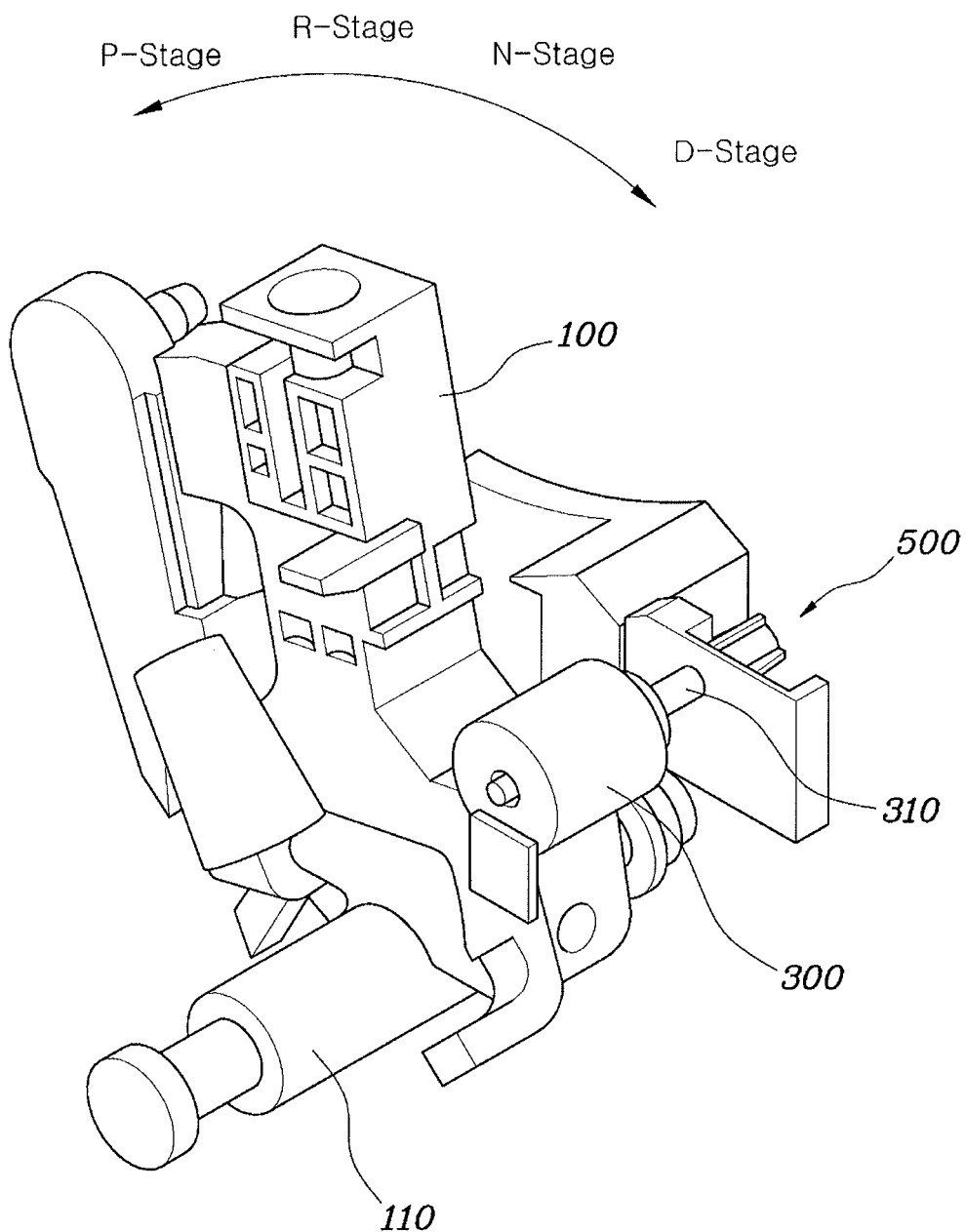
FIG. 1 is a view illustrating a shift lock structure of a shift lever according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a shift lock structure of a shift lever according to an exemplary embodiment of the present invention will be described with reference to the accompanying drawings.

Figure 2:
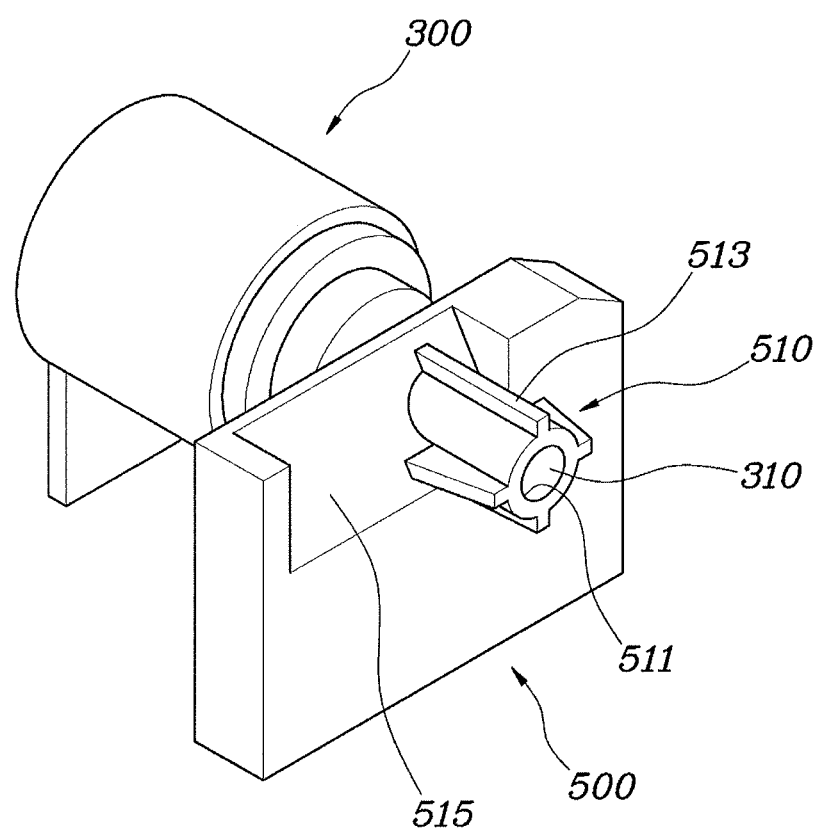
FIG. 2 and FIG. 3 are views each illustrating a solenoid valve and a lock lever more specifically.
Figure 3:
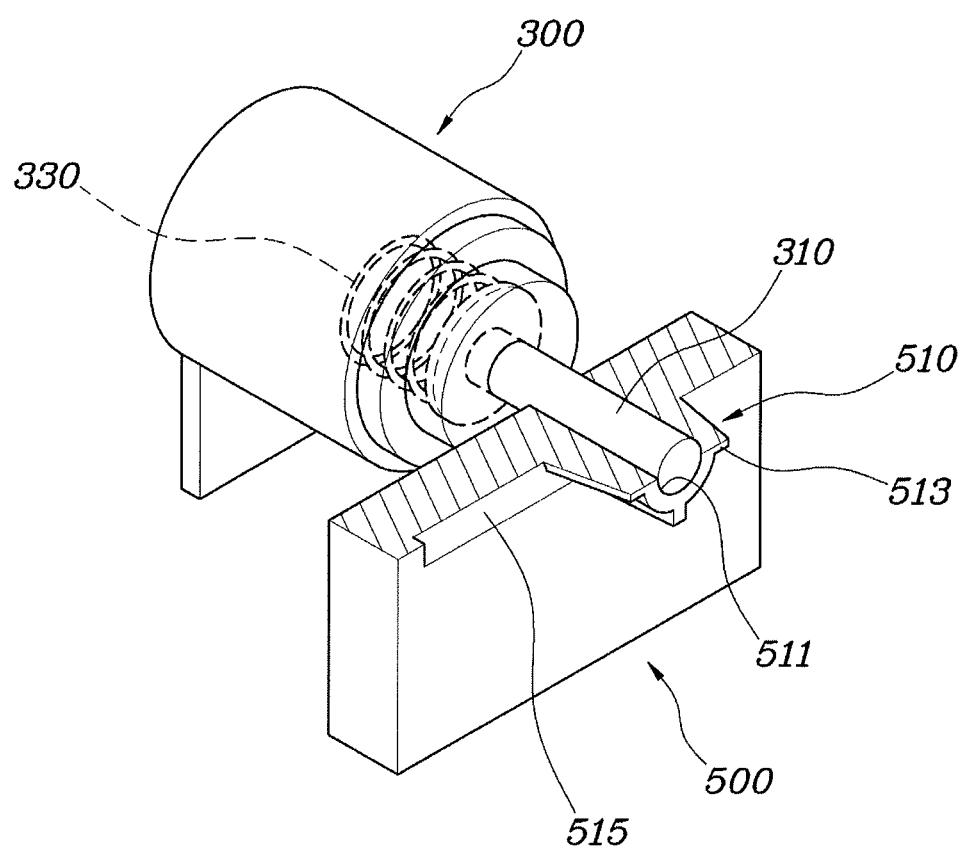
Figure 4:
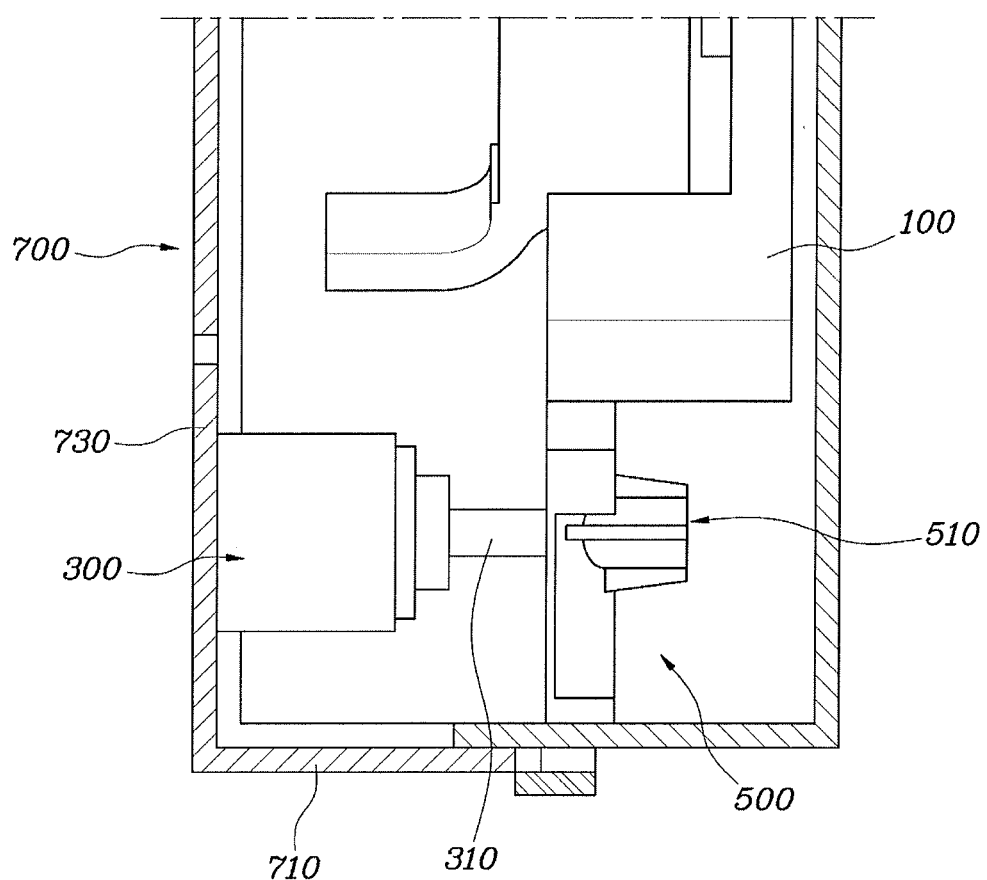
FIG. 4 and FIG. 5 are views illustrating a shift lock state and a shift lock release state, respectively.
Figure 5:
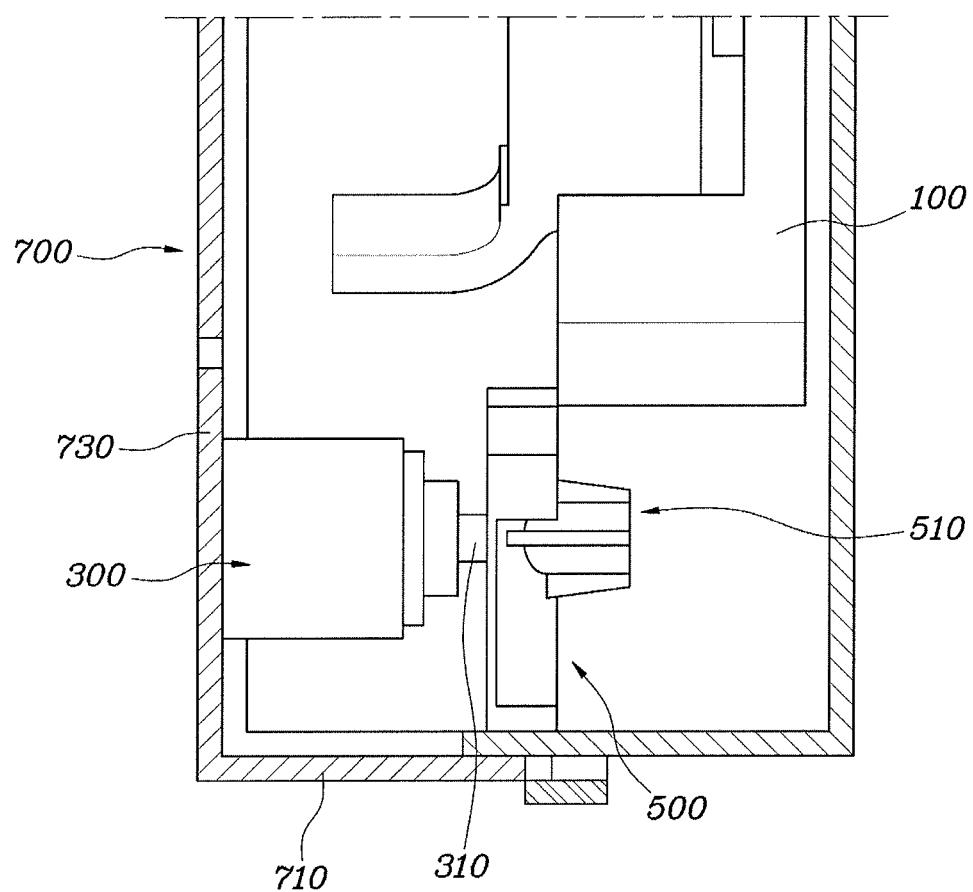
Figure 6:
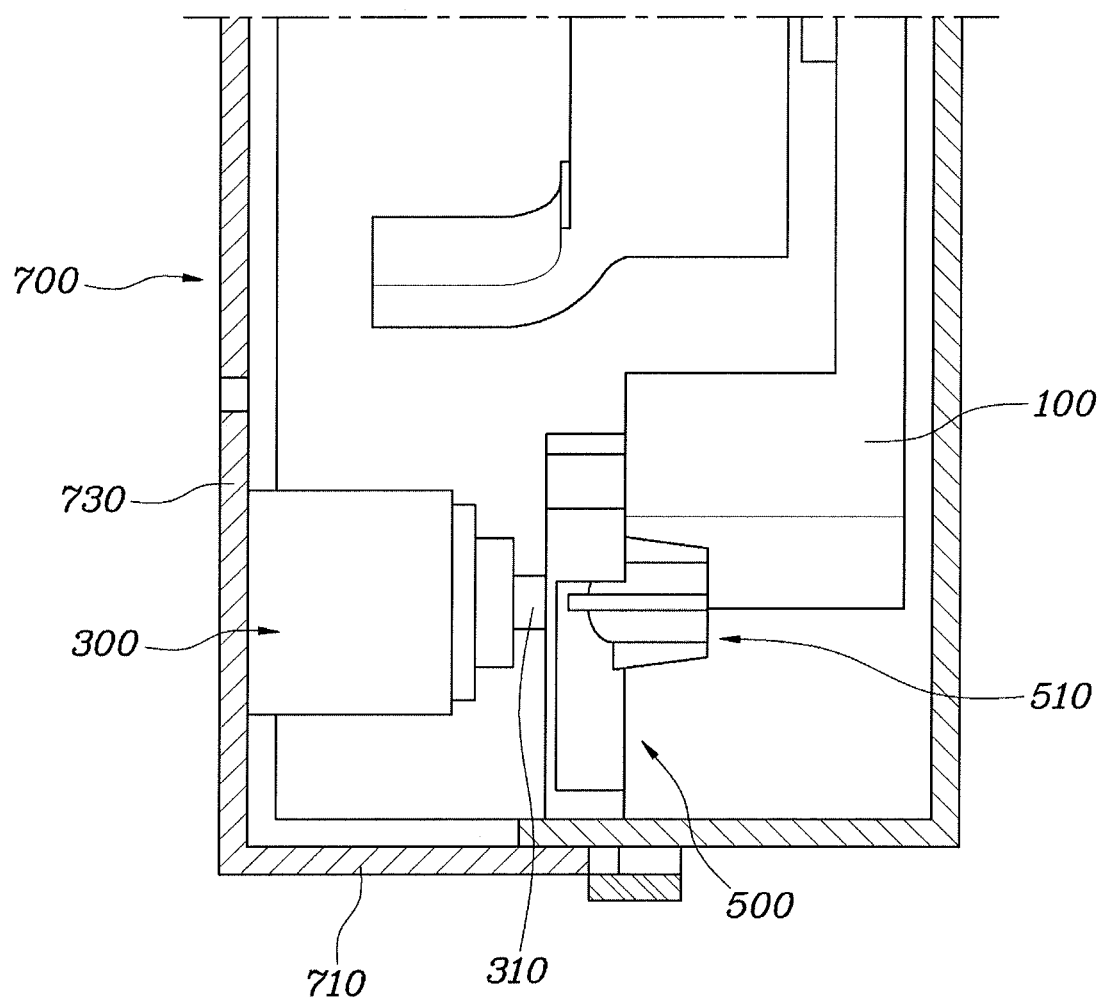
FIG. 6 is a view illustrating the case where a shift lock is implemented again after the shift lock is released.

FIG. 1 is a view illustrating a shift lock structure of a shift lever according to an exemplary embodiment of the present invention, FIG. 2 and FIG. 3 are views illustrating a solenoid valve 300 and a lock lever 500 more specifically, FIG. 4 and FIG. 5 are views illustrating a shift lock state and a shift lock release state, respectively, and FIG. 6 is a view illustrating the case where a shift lock is implemented again after the shift lock is released. The present invention may be applied to an automatic transmission of a vehicle.

As illustrated in FIG. 1, the shift lock structure of a shift lever according to an exemplary embodiment of the present invention may include: an engaging lever 100 provided at the lower end portion of a shift lever and rotated when the shift lever is rotated; a solenoid valve 300 having a plunger 310 extending in a direction intersecting the direction in which the engaging lever 100 is rotated and configured to allow the plunger 310 to be retracted or extracted depending on a shift stage; and a lock lever 500 located in a rotation direction thereof, in which the engaging lever 100 is rotated from a P-stage to another stage, and coupled with the plunger 310 such that, in the case in which the shift stage is the P-stage, when the plunger 310 is extracted and moved in the axial direction thereof, the lock lever 500 blocks the rotation of the engaging lever, implementing the shift lock.

The engaging lever 100 is provided at the lower end portion of the shift lever and is rotated when the shift lever is rotated. When the user operates the shift lever to execute a shift for travel of the vehicle or during the traveling of the vehicle, a shift cable is pushed or pulled so that the shift is executed.

The solenoid valve 300 has a plunger 310 extending in a direction intersecting the direction in which the engaging lever is rotated. The plunger 310 is retracted or extracted depending on the shift stage. That is, when the user manipulates the shift lever so that an electrical signal indicating that the shift lever is positioned at the P-stage is input, the plunger 310 is extracted. Furthermore, an elastic member 330 is disposed inside the solenoid valve to press the plunger 310 in the direction in which the plunger is extracted, so that when shifting to the P-stage is performed again by the elastic force of the elastic member 330 after the shift lock is released, the lock lever 500 is moved in the direction in which the lock lever 500 blocks the engaging lever, implementing the shift lock.

The lock lever 500 is coupled to the end portion of the plunger 310 of the solenoid valve 300 to prevent the engaging lever 100 from being rotated. Therefore, the lock lever 500 may be located in the rotation direction of the engaging lever 100, in which the engaging lever 100 is rotated from the P-stage to another stage. When the shift stage is the P-stage, the plunger 310 is extracted and moved in the axial direction thereof, so that the lock lever 500 blocks the rotation of the engaging lever, implementing the shift lock. The lock lever 500 is coupled with the plunger 310 of the solenoid valve 300 so such that the lock lever 500 is moved each time the plunger 310 is retracted or extracted.

Furthermore, the engaging lever 100, the lock lever 500, and the solenoid valve 300 are disposed in a main bracket 700 provided in a shift lever assembly. The engaging lever 100 is rotatably disposed to the side surface 730 of the main bracket 700 by the rotation shaft 110, and the solenoid valve 300 disposed to the side surface 730 of the main bracket 700 and the lock lever 500 coupled with the plunger 310 of the solenoid valve 300 500 are located between the main bracket 700 and the rotation direction of the engaging lever 100. The front side of the lock lever 500 is disposed to be in plane contact with the engaging lever 100, and the rear side of the lock lever 500 is disposed to be in contact with and supported by the rear surface 710 of the main bracket 700. Therefore, when the shift lock is implemented, the lock lever 500 is inserted and supported between the engaging lever 100 and the rear surface 710 of the main bracket 700, preventing the engaging lever 100 from being rotated. That is, the main bracket 700 is a housing of the shift lever, and is configured to support the lock lever 500 when the shift lock is forcibly released at the P-stage such that a load is supported by the load bracket 700 rather than the plunger 310.

The lock lever 500 will be described in more detail with reference to FIG. 2 and FIG. 3. As illustrated in the figures, the lock lever 500 may have a plate shape having a predetermined thickness and area. By forming the lock lever 500 to have a predetermined thickness, the engaging lever 100 and the lock lever 500 are in plane contact with each other so that when the lock lever blocks the rotation of the engaging lever 100 at the time of performing the shift lock, the force to support the lock lever 500 is increased.

The lock lever 500 has a coupling portion 510, which is coupled with the plunger 310. The coupling portion 510 may be a through hole 511 formed in the lock lever 500. As illustrated in the figure, the coupling portion 510 may have a cylindrical shape or may have a truncated cone shape, the diameter of which decreases from one end side toward a remaining end side of the surface of the lock lever 500. The coupling portion 510 protrudes from the surface of the plunger 310 on the side opposite to the lock lever 500. Furthermore, a plurality of ribs 513 protruding in the radial direction may be formed on the external circumferential surface of the coupling portion 510 at predetermined intervals. Therefore, the ribs 513 are configured to prevent the lock lever 500 from being twisted by a load during the forcible release of the P-stage, and to cause the lock lever 500 to be moved parallel to the side surface of the main bracket 700.

Furthermore, the lock lever 500 has an interference prevention groove 515 recessed inwardly from the surface thereof. Therefore, interference between the shift lever and the lock lever 500 during the rotation of the shift lever is prevented, so that accurate shifting of the shift lever is supported.

The operation of the shift lock structure of the shift lever of the present invention will be described with reference to FIG. 4, FIG. 5 and FIG. 6.

FIG. 4 is a view illustrating the implementation of a shift lock. When the shift lever is positioned at the P-stage, the plunger 310 of the solenoid valve 300 is extracted. When the plunger 310 is extracted, the lock lever 500 coupled to the plunger 310 is moved in the axial direction of the plunger 310, and the plunger 310 is located between the engaging lever 100 and the main bracket 700 to block the rotation of the engaging lever 100. Since the main bracket 700, the lock lever 500, and the engaging lever 100 are configured to minimize a gap therebetween, when the shift lock is forcibly released without operating the solenoid valve 300, the locking lever 500 is prevented from being twisted and the load is dispersed by the lock lever 500 to the main bracket 700 to be supported, so that rotation of the engaging lever 100 may be prevented, preventing erroneous operation.

FIG. 5 is a view illustrating the shift lock release state. FIG. 5 illustrates an operation of releasing the shift lock by pushing a release button for double parking or the like, even when the shift lever has been placed in the P-stage. Upon receipt of a signal or the like, which indicates that the release button is pushed for releasing the shift lock, the plunger 310 is retracted into the solenoid valve 300. When the plunger 310 is retracted, the lock lever 500 coupled to the plunger 310 is moved in the axial direction of the plunger 310, and the plunger 310 escapes from a space between the engaging lever 100 and the main bracket 700 so that the engaging lever 100 may be freely rotated.

FIG. 6 is a view illustrating the case in where the shift lock is implemented again after the shift lock is released. At the present time, when the engaging lever 100 is rotated to be positioned at the P-stage, the plunger 310 is extracted by the elastic force of the elastic member 330 in the solenoid valve 300, so that the lock lever 500 is returned and located between the engaging lever 100 and the main bracket 700, so that the shift lock for preventing the rotation of the engaging lever 100 is implemented.

Therefore, according to the shift lock structure of the shift lever of the present invention as described above, the release structure for releasing the shift lock may be implemented with a simple configuration. When the shift lever is forcibly operated at the time of erroneous operation or theft, the specification for forced release of the P-stage by the lock lever is enhanced, improving quality. Furthermore, by disposing the solenoid valve at the rear side, it is possible to implement a compact shift lever assembly, so that a layout of the shift lever assembly may be enhanced, and flexibility in designing a console portion and the productivity of an assembly line may be improved.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A shift lock structure of a shift lever, the shift lock structure including:
   an engaging lever provided at a lower end portion of the shift lever and rotated when the shift lever is rotated;
   a solenoid valve having a plunger extending in a direction intersecting a direction in which the engaging lever is rotated and configured to allow the plunger to be retracted or extracted depending on a shift stage; and
   a lock lever located in a rotation direction in which the engaging lever is rotated from a P-stage to another stage, and coupled with the plunger such that, in a case in which the shift stage is the P-stage, when the plunger is extracted and moved in an axial direction thereof, the lock lever blocks a rotation of the engaging lever, implementing a shift lock,
   wherein the lock lever has a coupling portion, which is coupled with the plunger, and the coupling portion is formed in a cylindrical shape and has a through hole formed in a center thereof, the coupling portion protruding from a surface of the lock lever which is opposite to the plunger.

2. The shift lock structure of claim 1, wherein the lock lever has a plate shape having a predetermined thickness and area, and the engaging lever and the lock lever are in plane contact with each other.

3. The shift lock structure of claim 1, wherein the coupling portion has a truncated cone shape, a diameter of which decreases from an end side thereof toward a remaining end side of a surface of the lock lever.

4. The shift lock structure of claim 1, wherein the coupling portion has a radially protruding rib being formed on an external circumferential surface of the coupling portion.

5. The shift lock structure of claim 1, wherein the lock lever has an interference prevention groove recessed inwardly from a surface thereof, so that the shift lever and the lock lever are prevented from interfering with each other when the shift lever is rotated.

6. The shift lock structure of claim 1, wherein the engaging lever is rotatably disposed to a main bracket, and the solenoid valve disposed to the main bracket and the lock lever coupled to the plunger of the solenoid valve are located between the main bracket and the rotation direction of the engaging lever.

7. The shift lock structure of claim 6, wherein a front side of the lock lever is disposed to be in plane contact with the engaging lever, and a rear side of the lock lever is disposed to be in contact with and supported by a rear surface of the main bracket, so that at a time of the shift lock, the lock lever is inserted and supported between the engaging lever and the rear surface of the main bracket, preventing the engaging lever from being rotated.

8. The shift lock structure of claim 1, further including:
an elastic member disposed inside the solenoid valve to press the plunger in a direction in which the plunger is extracted, so that when shifting to the P-stage is performed again after the shift lock is released, the lock lever is moved by an elastic force of the elastic member in a direction in which the lock lever blocks the engaging lever, implementing the shift lock.

9. The shift lock structure of claim 1, wherein the coupling portion includes at least a rib protruding in a radial direction on an external circumferential surface of the coupling portion.

10. The shift lock structure of claim 5,
wherein the coupling portion includes at least a rib protruding in a radial direction on an external circumferential surface of the coupling portion, and
wherein the rib is protrudingly formed on the interference prevention groove.

11. The shift lock structure of claim 5,
wherein the coupling portion includes a plurality of ribs protruding in a radial direction on an external circumferential surface of the coupling portion, and
wherein the ribs are protrudingly formed on the interference prevention groove with predetermined angular intervals.

* * * * *